(12) United States Patent
Gyldenlöv et al.

(10) Patent No.: US 10,588,329 B2
(45) Date of Patent: Mar. 17, 2020

(54) ICE CREAM PRODUCTION APPARATUS AND METHOD OF CONTROLLING AN ICE CREAM PRODUCTION APPARATUS

(71) Applicant: TETRA LAVAL HOLDINGS & FINANCE S.A., Pully (CH)

(72) Inventors: Steen Gyldenlöv, Lystrup (DK); Peter Gonon, Århus N (DK)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 303 days.

(21) Appl. No.: 15/508,371

(22) PCT Filed: Sep. 4, 2015

(86) PCT No.: PCT/EP2015/070216
§ 371 (c)(1),
(2) Date: Mar. 2, 2017

(87) PCT Pub. No.: WO2016/034700
PCT Pub. Date: Mar. 10, 2016

(65) Prior Publication Data
US 2017/0295818 A1    Oct. 19, 2017

(30) Foreign Application Priority Data

Sep. 5, 2014 (SE) ..................... 1451038

(51) Int. Cl.
*A23G 9/14* (2006.01)
*A23G 9/16* (2006.01)
*A23G 9/22* (2006.01)

(52) U.S. Cl.
CPC ............. *A23G 9/14* (2013.01); *A23G 9/16* (2013.01); *A23G 9/22* (2013.01); *A23G 9/228* (2013.01)

(58) Field of Classification Search
CPC . A23G 9/14; A23G 9/16; A23G 9/163; A23G 9/22; A23G 9/228
See application file for complete search history.

(56) References Cited

U.S. PATENT DOCUMENTS 2,067,683 A    1/1937  Routh
4,417,610 A *  11/1983 Waldstrom ............... B65B 3/36
                                                        141/188

(Continued)

FOREIGN PATENT DOCUMENTS

EP    0 448 503 A1    9/1991
EP    0 729 707 A2    9/1996

(Continued)

OTHER PUBLICATIONS

Office Action dated Dec. 8, 2017, by the Danish Patent and Trademark Office in corresponding Danish Patent Application No. PA 2017 70219. (10 pages).

(Continued)

*Primary Examiner* — Nelson J Nieves
(74) *Attorney, Agent, or Firm* — Buchanan Ingersoll & Rooney PC

(57) ABSTRACT

An ice cream production apparatus comprises a control unit, a freezer, a freezer outlet pump and a piping system provided from the freezer to one or more ice cream outlet nozzles downstream the freezer, can assume at least two operational modes. The first operational mode is a production mode. The second operational mode is a pre-production mode comprising the steps of freezing the ice cream in the freezer such that the ice cream obtains a pre-production viscosity value being equal to or higher than a production viscosity value, and pumping the frozen ice cream into the piping system at a pre-production outlet flow being smaller than a production outlet flow. The pre-production mode is used for cooling the (Continued)

piping system and the ice cream outlet nozzles before operating the ice cream production apparatus in the production mode.

19 Claims, 2 Drawing Sheets

(56) References Cited

U.S. PATENT DOCUMENTS

| | | | | |
|---|---|---|---|---|
| 4,712,920 | A * | 12/1987 | Ames | A23G 9/163 366/144 |
| 5,016,446 | A * | 5/1991 | Fiedler | A23G 9/163 222/146.6 |
| 5,024,066 | A | 6/1991 | Goavec | |
| 5,615,559 | A * | 4/1997 | Kress | A23G 9/16 62/136 |
| 6,637,214 | B1 | 10/2003 | Leitzke et al. | |
| 2005/0106301 | A1 * | 5/2005 | Jones | A23G 9/04 426/524 |
| 2006/0024418 | A1 * | 2/2006 | White | A23G 9/14 426/565 |
| 2011/0132010 | A1 * | 6/2011 | Liberman | A23G 9/14 62/132 |
| 2011/0197622 | A1 * | 8/2011 | Boekhoorn | A23G 9/28 62/384 |
| 2014/0196476 | A1 * | 7/2014 | Petersen | A23G 9/163 62/66 |
| 2016/0113305 | A1 * | 4/2016 | Cocchi | A23G 9/14 426/231 |
| 2016/0198735 | A1 * | 7/2016 | Beth Halachmi | A23G 9/045 99/468 |

FOREIGN PATENT DOCUMENTS

| | | |
|---|---|---|
| WO | 2004/089102 A1 | 10/2004 |
| WO | WO 2013/023986 A1 | 2/2013 |

OTHER PUBLICATIONS

International Search Report (PCT/ISA/210) dated Nov. 18, 2015, by the European Patent Office as the International Searching Authority for International Application No. PCT/EP2015/070216.

Arbuckle, W.S., "Ice Cream", Emeritus Professor of Dairy Science, University of Maryland, Fourth Edition, XP-002750525, The AVI Publishing Company, Inc., Westport, Connecticut, Jan. 1, 1986, pp. 218-227.

* cited by examiner

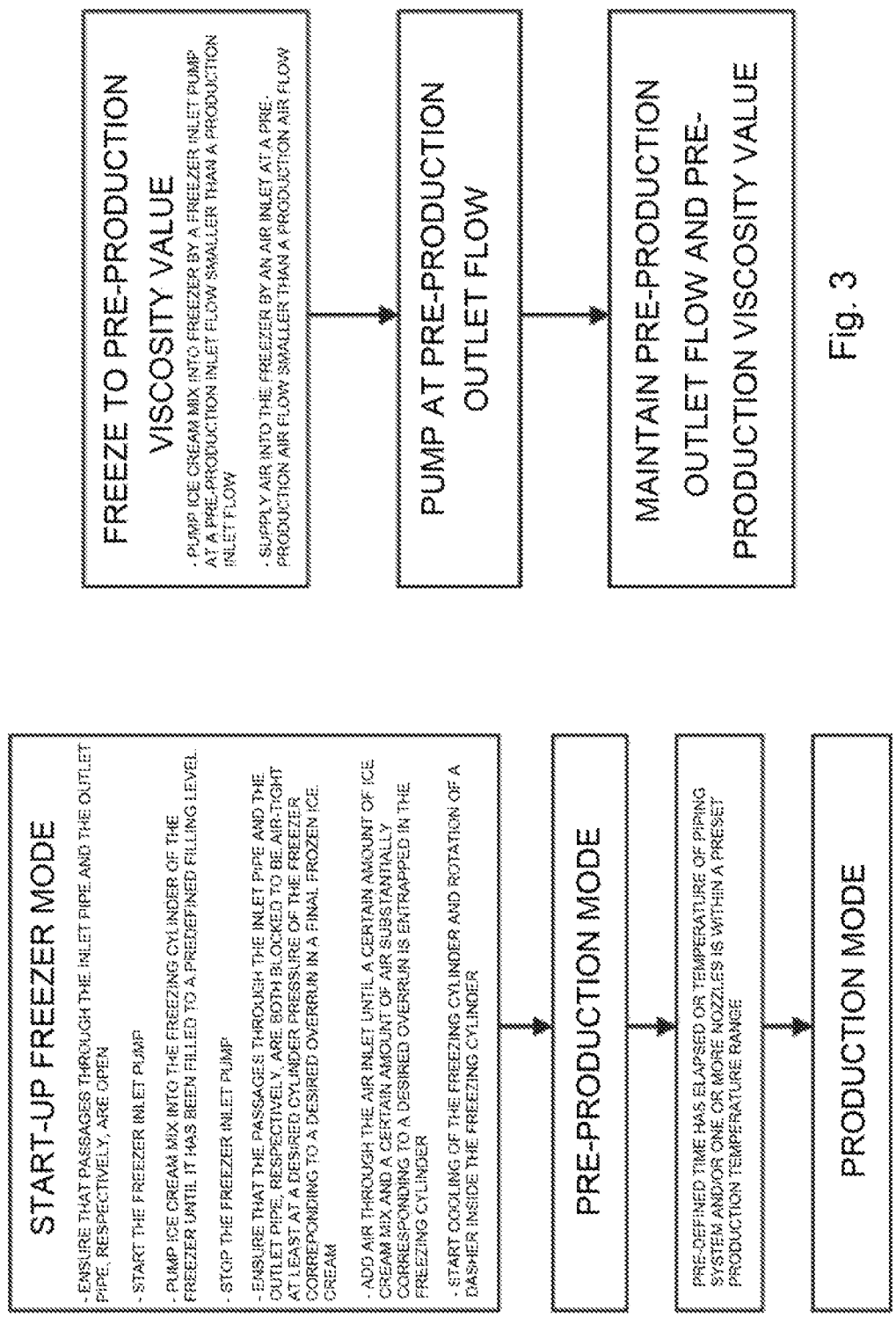

ICE CREAM PRODUCTION APPARATUS AND METHOD OF CONTROLLING AN ICE CREAM PRODUCTION APPARATUS

TECHNICAL FIELD

The present invention relates to an ice cream production apparatus for producing edible ice cream as well as a system comprising said ice cream production apparatus. The present invention also relates to a method of controlling such an ice cream production apparatus.

BACKGROUND OF THE INVENTION

There are many types of ice cream products on the market including related products such as for example milk ice, sorbet, sherbet and water ice. A typical process for making ice cream products involves some general steps:

Pre-heating and mixing: the liquid ice cream ingredients are heated and blended in a tank and the dry ingredients are added via a mixing unit. A homogenous so called "ice cream mix" (also known just as "mix") is formed.

Homogenisation, pasteurization, cooling: The ice cream mix is pre-heated in a plate heat exchanger, homogenisated and returned to the plate heat exchanger for pasteurization. The pasteurised ice cream mix is then cooled.

Ageing: The ice cream mix is aged a period of time (typically at least 4 hours) at a temperature of 2-5° C. and during gentle agitation.

Continuous freezing: After ageing the ice cream mix is fed to a continuous freezer in which a controlled amount of air is whipped into the mix and in which a part of the water content of the mix is freezed into small ice crystals. The temperature of the frozen ice cream is typically in the range of −3 to −7° C.

Filling, extrusion, moulding: The frozen ice cream is fed to either filling lines, moulded stick novelty lines or extrusion lines depending on the type of ice cream product to be manufactured. Optionally, the ice cream is first fed via an ingredient feeder for addition of for example nuts, chocolate, jam or fruit pieces.

Continuous hardening: The ready ice cream product is made to harden to a temperature of about −20° C.

In the freezing step it is well-known to use so-called through-flow freezers comprising a freezing cylinder in which a mixture of ice cream mix and air is frozen to ice cream by cooling the freezing cylinder from its outside using a liquid coolant. The ice cream mass is typically transported through the freezing cylinder by pumping. A freezer of this type is described in the international publication WO2013/023986. The document further describes a process for initiating production, i.e. a pre-production step or start-up step, in which the ratio air/ice cream mix is balanced to reach preset values before the frozen ice cream is pumped out of the freezer and to the filling lines. The process described in WO2013/023986 has as its purpose to reduce the time consumed and the amount of waste ice cream produced until stable conditions for the continuous production have been reached.

Another issue during start up, causing waste ice cream, is the temperature of the piping system. The piping system typically comprises from a few meters to a few dozen meters of stainless steel pipes, which pipes transport the frozen ice cream from the freezer to the output nozzles of the filling lines, moulded stick novelty lines or extrusion lines. Before continuous production can be performed the piping system needs to be cooled. Typically, the cooling is made by the ice-cream itself during the transport, i.e. through thermal conductivity between the ice cream and the pipes. Any ice-cream used for the initial cooling is wasted, i.e. all ice cream being fed through the pipes until the pipes have reached a pre-defined low temperature is supplied, via the filling nozzles, to a waste vessel.

SUMMARY OF THE INVENTION

In view of the above, one object of the present invention is therefore to reduce the amount of ice cream wasted during cooling of the piping system, i.e. during start-up of the production.

Above object is achieved by a method for controlling an ice cream production apparatus. Said apparatus comprises a control unit, a freezer, a freezer outlet pump and a piping system provided from the freezer to one or more ice cream outlet nozzles of one or more filling or extrusion lines downstream the freezer. Said method comprises controlling, by the control unit, the apparatus to assume at least two operational modes, wherein a first operational mode is a production mode comprising the steps of freezing the ice cream in the freezer such that the ice cream obtains a production viscosity value, and pumping, with the freezer outlet pump, the frozen ice cream into the piping system at a production outlet flow. The second operational mode is a pre-production mode comprising the steps of freezing the ice cream in the freezer such that the ice cream obtains a pre-production viscosity value being equal to or higher than the production viscosity value, and pumping, with the freezer outlet pump, the frozen ice cream into the piping system at a pre-production outlet flow being smaller than the production outlet flow. The method comprising the step of controlling the ice cream apparatus to assume the pre-production mode in order to cool the piping system and the one or more ice cream outlet nozzles, such that the amount of waste ice cream can be decreased, before operating the ice cream production apparatus in the production mode.

In one or more embodiments the method comprises the step of continuing operating the ice cream production apparatus in the pre-production mode until a pre-defined time has elapsed or until the temperature of said piping system and/or said one or more nozzles is within a preset production temperature range.

In one or more embodiments the step of freezing the ice cream in the pre-production mode comprises the steps of pumping ice cream mix into the freezer by a freezer inlet pump at a pre-production inlet flow being smaller than a production inlet flow, and supplying air into the freezer by an air inlet at a pre-production air flow being smaller than a production air flow.

Further, in one or more embodiments a ratio of the pre-production inlet flow and the pre-production air flow is substantially equal to a ratio of the production inlet flow and the production air flow in order to maintain a pre-defined overrun from the pre-production mode to the production mode.

Furthermore, in one or more embodiments the method comprises measuring the temperature of the piping system by one or several temperature sensors.

In one or more embodiments the pre-production viscosity value is about 0-50% higher than the production viscosity value.

In one or more embodiments the pre-production viscosity value is 10-30%, preferably 20%, higher than the production viscosity value.

In one or more additional embodiments the pre-production outlet flow is about 10-75% of the production outlet flow.

In one or more embodiments the method comprises controlling the ice cream production apparatus to assume a freezer start-up mode before assuming the pre-production mode.

In one or more embodiments the freezer start-up mode comprises the steps of ensuring that passages through an inlet pipe and an outlet pipe, respectively, are open, starting the freezer inlet pump, pumping ice cream mix into a freezing cylinder of the freezer until it has been filled to a predefined filling level, stopping the freezer inlet pump, ensuring that the passages through the inlet pipe and the outlet pipe, respectively, are both blocked to be air-tight at least at a desired cylinder pressure of the freezer corresponding to a desired overrun in a final frozen ice cream, adding air through the air inlet until a certain amount of ice cream mix and a certain amount of air substantially corresponding to a desired overrun is entrapped in the freezing cylinder, starting cooling of the freezing cylinder and rotation of a dasher inside the freezing cylinder.

In one or more embodiments the method comprises controlling the apparatus to assume the pre-production mode, from start-up freezer mode, when the pre-production viscosity value of the ice cream in the freezing cylinder is reached, by opening the passages through the inlet pipe and the outlet pipe, starting the first and freezer inlet pumps, and adding air in a measured amount corresponding to the desired overrun in the final frozen ice cream.

The object is further achieved by a method for cooling a piping system comprised in an ice cream production apparatus, said piping system being provided from a freezer to one or more ice cream outlet nozzles of one or more filling or extrusion lines downstream the freezer. Said method comprises operating the ice cream production apparatus in a pre-production mode before operating it in a production mode, said pre-production mode comprising: freezing the ice cream in the freezer such that the ice cream obtains a pre-production viscosity value being equal to or higher than a production viscosity value, and pumping the frozen ice cream into the piping system at a pre-production outlet flow being smaller than a production outlet flow.

The object is further achieved by an ice cream production apparatus for producing edible ice cream. Said apparatus comprises a freezer for freezing the ice cream, a piping system provided from the freezer to one or more outlet nozzles of one or more filling or extrusion lines downstream the freezer, a freezer outlet pump for pumping the frozen ice cream from the freezer into the piping system, a control unit controlling the ice cream production apparatus, wherein said apparatus having two operational modes: a first operational mode being a production mode in which the freezer is configured to freeze the ice cream such that it obtains a production viscosity value, and the freezer outlet pump is configured to pump the frozen ice cream into the piping system at a production outlet flow, and a second operational mode being a pre-production mode in which the freezer is configured to freeze the ice cream such that it obtains a pre-production viscosity value which is equal to or higher than the production viscosity value, and the freezer outlet pump is configured to pump the frozen ice cream into the piping system at a pre-production outlet flow being smaller than the production outlet flow, wherein the control unit is adapted to control the apparatus to assume the pre-production mode in order to cool the piping system and the one or more outlet nozzles before assuming the production mode.

In one or more embodiments the control unit is adapted to control the apparatus to assume the pre-production mode until a pre-defined time has elapsed or until the temperature of said piping system and said one or more nozzles is within a preset production temperature range.

In one or more embodiments the freezer comprises a freezer inlet pump adapted to pump ice cream mix into the freezer and an air inlet adapted to provide air into the freezer, wherein in the production mode the freezer inlet pump is adapted to pump the ice cream mix at a production inlet flow and the air inlet is adapted to provide air at a production air flow, and in the pre-production mode the pump is adapted to pump the ice cream mix at a pre-production inlet flow being smaller than the production inlet flow, and the air inlet is adapted to provide air at a pre-production air flow being smaller than the production air flow.

In one or more embodiments the control unit is provided to control the flows such that a ratio of the pre-production inlet flow and the pre-production air flow is substantially equal to a ratio of the production inlet flow and the production air flow in order to maintain a pre-defined overrun from the pre-production mode to the production mode.

In one or more embodiments the freezer outlet pump is a positive displacement pump.

Further, in one or more embodiments the freezer is a through-flow freezer.

Furthermore, in one or more embodiments the ice cream production apparatus comprises temperature sensors for measuring the temperature of said piping system and/or said one or more nozzles.

In one or more embodiments the through-flow freezer comprises: a freezing cylinder for making ice cream by freezing an ice cream mix, an inlet pipe for leading mix into the freezing cylinder, an inlet blocking device arranged to block mix or air from entering or leaving the freezing cylinder via the inlet pipe in a closed state, an air inlet for adding air directly into the freezing cylinder or into the inlet pipe between the freezing cylinder and the inlet blocking device, an outlet pipe for leading ice cream away from the freezing cylinder and an outlet blocking device arranged to block mix, air or ice cream from entering or leaving the freezing cylinder via the outlet pipe in a closed state, wherein, at least in a freezer start-up mode the inlet blocking device and the outlet blocking device are arranged to be closed such that a certain amount of mix and a certain amount of air substantially corresponding to a desired overrun in the freezing cylinder can be entrapped in the freezing cylinder by introducing air via the air inlet.

The object is further achieved by an ice cream production system for producing edible ice cream. Said ice cream production system comprises a first apparatus adapted to pre-heat liquid ice cream ingredients and to mix said ingredients with dry ice cream ingredients for formation of an ice cream mix, a second apparatus adapted to homogenize, pasteurize and cool the ice cream mix, a third apparatus adapted to age the ice cream mix, and a fourth apparatus being the ice cream production apparatus described above.

BRIEF DESCRIPTION OF DRAWINGS

In the following, embodiments of the invention will be described in greater detail, with reference to the enclosed drawings, in which:

FIG. 2 is a flow chart of the operational modes of the method of controlling an ice cream production apparatus according to the invention.

FIG. 3 is a flow chart of the method steps of the pre-production mode.

Equal or corresponding elements are denominated by the same reference numbers in all figures.

DETAILED DESCRIPTION OF EMBODIMENTS

Figure 1:
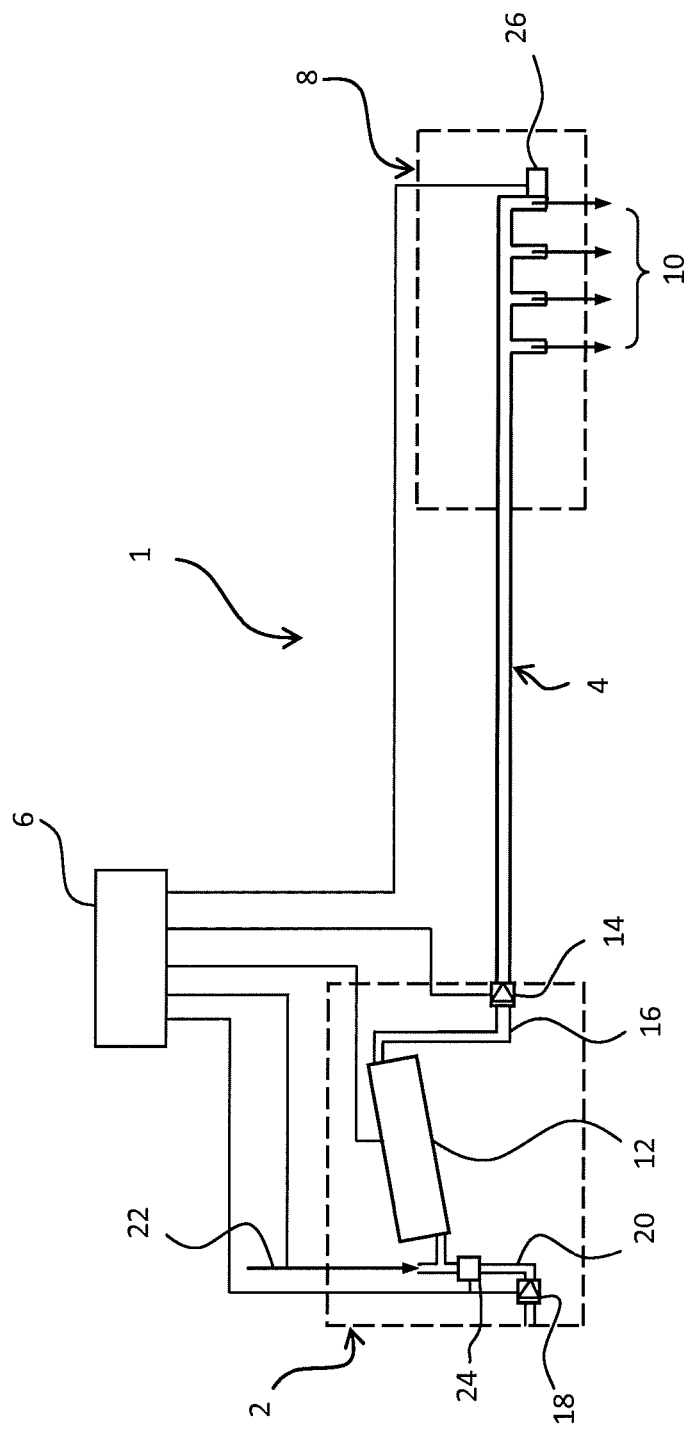
FIG. 1 is a schematic illustration of an ice cream production apparatus according to the invention.

FIG. 1 shows a schematic illustration of an ice cream production apparatus 1 for producing edible ice cream products. Overall, the apparatus comprises a freezer 2, a piping system 4, a control unit 6 and filling or extrusion lines 8 comprising ice cream outlet nozzles 10.

The freezer 2 is of the through-flow type which means that it continuously mix and freeze ice cream mix and air to frozen ice cream. The main component of the through-flow freezer 2 is the elongate freezing cylinder 12. A jacket surrounds the freezing cylinder 2 at a distance and in the intermediate space a refrigerant is provided that generates the freezing process. The freezing cylinder 12 may be made from a metal such as nickel, brass, stainless steel or black steel, and the inside surface thereof may be plated for hygienic reasons, for instance with hard chromium.

In the freezing cylinder 12, the ice cream mix and air added thereto is whipped or stirred by a dasher (not shown) and frozen to ice cream, while frozen ice cream is scraped from the inside of the freezing cylinder 12 by means of, for instance, stainless steel blades, so called dasher knives.

A freezer outlet pump 14 is arranged for pumping frozen ice cream away from the freezing cylinder 12 through an outlet pipe 16, which extends from an upper part of the freezing cylinder 12, at an outlet end of thereof. The outlet pipe 16 is part of the piping system 4. A freezer inlet pump 18 is arranged for pumping ice cream mix into the freezing cylinder 12 through an inlet pipe 20 opening into a lower part of the freezing cylinder 12 at an inlet thereof. The inlet end is remote from the outlet end of the freezing cylinder. As is shown in FIGS. 1 and 2 the freezing cylinder 12 is tilted such that the inlet end is positioned at a lower position than the outlet end.

An air inlet 22 is arranged in the freezer 2 so that air can be added to the ice cream mix passing through the inlet pipe 20 by means of an air pump (not shown), the amount of added air being metered by an air flow meter (not shown). It should be noted that although in the illustrated embodiment the air inlet 22 opens into the inlet pipe 20, it may open directly into the freezing cylinder 12 in other embodiments of the invention.

The increase in volume following the incorporation of air in the ice cream mix is called overrun, and is normally 50-160%, i.e. 0.5 to 1.6 litre of air per litre of ice cream mix. It should be emphasized that by the term "overrun" is to be understood the relative increase in volume of the final ice cream as compared to the volume of the mix used to produce that ice cream. Thus, if for instance 3 liters of final ice cream is produced from 2 liters of mix (the increased volume being due to the air added to the mix before freezing it), the overrun is 50%.

During the freezing process the freezing cylinder 12 with the dasher are arranged to freeze part of the water content in the ice cream mix into a large number of small ice crystals. This process changes the viscosity of the ice cream, and the viscosity is controlled by adjusting the cooling of the freezing cylinder 12. Hence, the viscosity is directly related to the temperature. The viscosity value is measured by measuring the load on the dasher motor, i.e. the torque necessary for rotating the dasher. In more detail, the definition of viscosity is here the actual measured load (torque) on the dasher motor as a percentage of the torque the main motor can supply at nominal load (with the actual gearing). The main motor size varies with the freezer size and the application of the freezer. The freezer is typically designed so that the production viscosity value for a typical ice cream is in the range of 40-80% i.e. the load on the dasher motor is 40-80% of the nominal value. The production viscosity value will be an average value for the ice cream mass within the freezing cylinder 12.

The output temperature of the ice cream is typically in the range of 3 to 7° C. depending on the type of ice cream product being produced, and about 30-55% of the water content is then frozen.

The freezer inlet pump 18 and the freezer outlet pump 14 are positive displacement pumps. Such pumps can be of either the rotary or reciprocating type. The principle of a positive displacement pump is that for each revolution or each reciprocating movement a definite net amount, i.e. volume of fluid (ice cream mix or air), is pumped. The flow can normally be controlled by regulating the speed, and the speed is determined by a flow meter. A flow meter 24 is shown in the inlet pipe 20. Adjustment of the stroke of a reciprocating pump is another possibility of controlling the speed.

The freezer inlet pump 18, the freezer outlet pump 14, the air inlet 22 and the freezing cylinder 12 are connected to the control unit 6 of the ice cream production apparatus 1. This is illustrated by dotted lines in FIG. 1.

As mentioned above the frozen ice cream is forwarded into the piping system 4 by the freezer outlet pump 14. The piping system 4, which comprises one or more stainless steel pipes, is provided to feed the frozen ice cream to the one or more filling or extrusion lines 8 downstream the freezer 2. The term "filling or extrusion lines 8" is to encompass all kinds of lines or devices in which the ice cream is finally formed or filled. In a filling line the ice cream is typically filled into cups, cones or containers. In extrusion lines, or tray tunnel systems, a large number of different ice cream products may be produced depending on the filling and handling equipment used. Examples of products are premium stick products, sandwich products, ball-top cones, filled wafer cups, ice cream cakes, ice cream logs and bit-size products. The term also encompasses for example moulded stick novelty lines, or stick novelty freezers, in which the ice cream is moulded in pockets to form a large variety of shaped products on sticks. Common for all these types of filling and extrusion lines is that they comprise one or more ice cream outlet nozzles 10, with which the ice cream is finally portioned out in the various containers, cones, trays or mould pockets used. Hence, the piping system 4 fluidly connects the freezer 2 with the outlet nozzles 10.

Optionally, the ice cream is fed from the freezer 2 via an ingredient feeder (not shown) to the filling or extrusion lines 8. The ingredient feeder is used for addition of for example nuts, chocolate, jam or fruit pieces to the ice cream before the final forming. In such case the piping system 4 connects the freezer with the outlet nozzles via the ingredient feeder.

The piping system 4 is provided with one or more temperature sensors for sensing the temperature of the pipes and the outlet nozzles. One temperature sensor, denoted 26, is shown in FIG. 1. The temperature sensors are connected to the control unit 6.

The control unit 6 is either connected to or is a part of a PLC (Programmable Logic Controller) module of the apparatus, or any other type of apparatus control system. It may comprise one single module, as shown in FIG. 1, or may comprise several physically separated but connected modules, i.e. one module connected to the freezer outlet pump and one module connected to the freezer inlet pump etc. The temperature sensor 26 is connected to the control unit 6 either directly or via a sub-control unit being a control unit of the filling or extrusion lines 8.

In the following, and with reference to flow charts in FIGS. 2 and 3, the operation and the control of the ice cream apparatus will be described, and especially the start-up of the production of ice cream products.

FIG. 2 shows an overview flow chart of the operational modes of the ice cream production apparatus. As an initial step a first batch of ice cream needs to be frozen in the freezing cylinder. This is made by controlling the apparatus to assume a start-up freezer mode. An exemplary start-up freezer mode is described in the international publication WO2013/023986, which is hereby incorporated by reference.

Generally, the start-up freezer mode is started by making sure that the passages through the inlet pipe 20 and the outlet pipe 16, respectively, are open, starting the freezer inlet pump 18 and filling the freezing cylinder 12 until a pre-defined filling level has been reached, while pressing air out through the outlet pipe 16. In one embodiment this pre-defined filling level is defined as the point at which there is an overflow of ice cream mix from the freezing cylinder 12 through the outlet pipe 16. In through-flow freezers, in which an air-tight freezer outlet pump 14 is used, this means that it will be necessary to let the freezer outlet pump 14 run or to put it in an open mode while filling the freezing cylinder 12.

As can be seen in FIG. 1, and as earlier described, the freezing cylinder 12 is inclined with respect to the horizontal in order to assure that it may be filled almost completely with ice cream mix through the inlet pipe 20 before ice cream mix starts overflowing through the outlet pipe 16.

Then the freezer inlet pump 18 (and the freezer outlet pump 14, if running) is stopped, air is added through the air inlet until a certain pressure has been reached inside the freezing cylinder 2, the dasher inside the freezing cylinder 12 is started and so is the cooling of the freezing cylinder 12 so that the content thereof is frozen into a first batch of ice cream. An inlet blocking device (not shown) is arranged to block ice cream mix or air from entering or leaving the freezing cylinder 12 via the inlet pipe 20. In this mode the blocking device is in a closed state. Further, an outlet blocking device (not shown) is arranged to block ice cream mix, air or ice cream from entering or leaving the freezing cylinder via the outlet pipe 16. In this mode that blocking device is also in a closed state. Hence, a certain amount of ice cream mix and a certain amount of air substantially corresponding to a desired overrun in the freezing cylinder can be entrapped in the freezing cylinder by introducing air via the air inlet 22. In a conventional ice cream production apparatus the actual production of edible ice cream products will start when a pre-defined production viscosity value of the ice cream mass inside the freezing cylinder has been reached. The continuous production is started by starting the freezer inlet and outlet pumps 18, 14 at production inlet and outlet flows respectively and adding air, by the air inlet 22, in a measured amount corresponding to the desired overrun in the final frozen ice cream. However, until the piping system 4 and the outlet nozzles 10 have been cooled down to a pre-defined temperature, the ice cream will be handled as waste after exiting the outlet nozzles 10. Since the pumps 14, 18 are operated at full production flows, the amount of waste will be large. Full production flow may for some ice cream production apparatuses be around 1000-3000 litres/hour.

According to the invention the apparatus is instead controlled to assume a pre-production mode, see FIG. 2. When the first batch of ice cream starts to freeze the start-up freezer mode is turned into a pre-production mode. Alternatively, in one or more embodiments, the pre-production mode and the start-up freezer mode can be combined into one single operational start-up mode.

The pre-production mode is mainly used for cooling the piping system 4 from the freezer 2 all the way to the one or more ice cream outlet nozzles 10 before operating the ice cream production apparatus in a normal production mode. During this cooling the piping system 4 needs to be cooled down to a certain pre-defined production temperature, and the cooling medium is the frozen ice cream itself. Hence, it is the thermal conductivity between the ice cream and the pipes that will accomplish the cooling.

FIG. 3 shows a flow chart of the steps of the pre-production mode. The first step of the pre-production mode is to freeze the ice cream in the freezer such that the ice cream obtains a pre-production viscosity value being equal to or higher than the normal production viscosity value. The pre-production viscosity value is about 0-50% higher than the production viscosity value. In some embodiments it is 10-30% higher, preferably 20% higher, than the production viscosity value. Hence, the ice cream is frozen to a lower temperature than during normal production. This will help quickly cooling the piping system. The pre-production viscosity value may alternatively be equal to the production viscosity value. The cooling will then take longer time. However, as will be described next, as long as the pre-production flow is lower than the production flow, the object of the invention, to decrease the amount of waste ice-cream during start-up, will still be achieved.

A second step is to start pumping, with the freezer outlet pump 14, the frozen ice cream into the piping system 4 at a pre-production outlet flow. The pre-production outlet flow is smaller than a production outlet flow, i.e. the flow of the freezer outlet pump 14 in the normal production mode. Hence, the ice cream is slowly advancing towards the outlet nozzles 10 and is cooling the pipes along the way.

The pre-production outlet flow can be set to about 10-75% of the production outlet flow depending on various parameters such as for example type and capacity of the ice cream apparatus, size of piping system, freezer etc. and type of ice cream.

In one exemplary ice cream production apparatus, having a maximum production flow of 3000 litres/hour, it has presently been possible to reach a pre-production flow in the range of 200-400 litres/hour, which is about 10% of the production flow. Normally, a typical through-flow freezer has a minimum capacity in the order of 10-20% of the maximum capacity. Hence, the pre-production flow cannot be lower than the minimum capacity, i.e. through-flow, of the freezer. It is also to be understood that a very low pre-production flow increases the time for filling the piping system and cool it. Hence, for each ice cream product and ice cream apparatus, the viscosity values and flows between production and pre-production need to be tested to reach the optimum process.

During the pre-production mode the freezer will be run at reduced capacity. The freezer inlet pump 18 pumps new ice cream mix into the freezing cylinder 12 at a pre-production inlet flow being smaller than a production inlet flow, i.e. smaller than normal production flow. The ratio between the pre-production inlet flow and the production inlet flow is the same as the ratio between the pre-production outlet flow and the production outlet flow to keep a stable freezing of the ice cream. At the same time air is supplied into the freezer through the air inlet 22 at a pre-production air flow being smaller than a production air flow. The production air flow corresponds to the flow during normal production.

A ratio of the pre-production inlet flow and the pre-production air flow is held substantially equal to a ratio of the production inlet flow and the production air flow, i.e. the supply of ice cream mix and air is kept constant in order to maintain a pre-defined overrun. These ratios are also kept from the pre-production mode to the production mode in order to keep the pre-defined overrun.

A third step involves maintaining freezing the ice cream to the pre-production viscosity value and continuing pumping, with the freezer inlet and outlet pumps 18, 14, at the pre-production inlet and outlet flows respectively and continuing supplying air at the pre-production air flow. The ice cream production apparatus is maintained in the pre-production mode until a pre-defined time has elapsed or until the temperature of the piping system and/or the one or more nozzles is within a preset production temperature range. If using a pre-defined time, the necessary time has been tried out during installation. The time is dependent on a number of factors. One factor is the design of the piping system, i.e. for instance the pipe dimensions and the number of meters of pipes running from the freezer to the outlet nozzles. In some ice cream production apparatuses the distance between the freezer and the outlet nozzles is for example 3 meters whereas in other ice cream production apparatuses the distance may be for example 30 meters. Since the ice cream needs to fill the entire piping system before production can start there will naturally be a difference in the pre-production running time for the two examples above. Another factor is the type of ice cream product to be produced. The contents of various ice cream products have different cooling effect, and will therefore affect the cooling of the piping system. For example, the sugar level of the ice cream affects the time. The sugar level has an influence of the freezing point depression, i.e. a high sugar level decreases the freezing point, and thereby the ice cream will be colder, which will cool down the piping system faster.

If the pre-production mode is run for a pre-defined time, the time necessary for cooling is, as mentioned above, tested out. Preferably, for each ice cream production apparatus, the time per ice cream product is stored in a database. The database is connected to the control unit 6 and upon start-up, when the operator is selecting the type of ice cream product to produce, the correct pre-production mode time is automatically retrieved from the database.

Alternatively, as mentioned above, the ice cream production apparatus is kept in pre-production mode until the temperature of the piping system 4 and/or the one or more outlet nozzles 10 is within a preset production temperature range. For this purpose the ice cream production apparatus is equipped with one or more temperature sensors. In the embodiment described in FIG. 1 a temperature sensor 26 is arranged at the outlet nozzles. The outlet nozzles 10 are typically provided farthest away from the freezer 2, at the end of the piping system 4, and once the outlet nozzles 10 are cooled the entire piping system 4 is cooled. The sensor can be of any type suitable for measuring the temperature of the nozzles and/or piping system, i.e. by being in contact with the nozzle material either on the inside or on the outside of the nozzles and/or piping system.

Alternatively, a combination is used, i.e. the temperature sensor is used as an additional check for extra safety. When the pre-defined time has lapsed the temperature sensor is used for checking that the low temperature has been reached.

The temperature sensor 26 is connected to the control unit 6.

When the pre-defined time has elapsed or when the pre-defined production temperature range has been reached the control unit is adapted to assume the production mode. The control unit 6 regulates the freezer 2 such that the ice cream is frozen to the production viscosity value, i.e. to a viscosity value being less than the pre-production viscosity value. Further, the freezer inlet and outlet pumps 18, 14 are regulated to pump according to the inlet and outlet production flows respectively, and the air inlet 22 is regulated such that a production flow is achieved. The production flows are higher than the corresponding pre-production flows.

It is apparent to a person skilled in the art that the described embodiments are examples and that various modifications are possible. The invention and its embodiments are thus not limited to the examples described above; instead they may vary within the scope of the claims.

The invention claimed is:

1. Method for controlling an ice cream production apparatus, said ice cream production apparatus comprises a control unit, a freezer, a freezer outlet pump and a piping system provided from the freezer to one or more ice cream outlet nozzles of one or more filling or extrusion lines downstream the freezer, wherein said method comprises controlling, by the control unit, the ice cream production apparatus to assume at least two operational modes, wherein
   a first operational mode is a production mode comprising the steps of continuously freezing the ice cream in the freezer such that the ice cream obtains a production viscosity value, and pumping, with the freezer outlet pump, the ice cream into the piping system at a production outlet flow, and
   a second operational mode is a pre-production mode comprising the steps of freezing the ice cream in the freezer such that the ice cream obtains a pre-production viscosity value being equal to or higher than the production viscosity value, and pumping, with the freezer outlet pump, the ice cream into the piping system, without recirculating the ice cream to the freezer, at a pre-production outlet flow being smaller than the production outlet flow, wherein
   the method comprising controlling the ice cream production apparatus to assume the pre-production mode in order to cool the piping system and the one or more ice cream outlet nozzles before operating the ice cream production apparatus in the production mode.

2. The method according to claim 1, comprising continuing operating the ice cream production apparatus in the pre-production mode until a pre-defined time has elapsed or until a temperature of said piping system and/or said one or more nozzles is within a preset production temperature range.

3. The method according to claim 1, wherein freezing the ice cream in the pre-production mode comprises:
   pumping ice cream mix into the freezer by a freezer inlet pump at a pre-production inlet flow being smaller than a production inlet flow, and
   supplying air into the freezer by an air inlet at a pre-production air flow being smaller than a production air flow.

4. The method according to claim 3, wherein a ratio of the pre-production inlet flow and the pre-production air flow is substantially equal to a ratio of the production inlet flow and the production air flow in order to maintain a pre-defined overrun from the pre-production mode to the production mode.

5. The method according to claim 2, further comprising measuring the temperature of the piping system by one or several temperature sensors.

6. The method according to claim 1, wherein the pre-production viscosity value is about 0-50% higher than the production viscosity value.

7. The method according to claim 1, wherein the pre-production viscosity value is about 10-30% higher than the production viscosity value.

8. The method according to claim 1, wherein the pre-production outlet flow is about 10-75% of the production outlet flow.

9. The method according to claim 1, wherein the method comprises controlling the ice cream production apparatus to assume a freezer start-up mode before assuming the pre-production mode.

10. The method according to claim 9, wherein the freezer start-up mode comprises:
ensuring that passages through an inlet pipe and an outlet pipe, respectively, are open,
starting a freezer inlet pump,
pumping ice cream mix into a freezing cylinder of the freezer until the freezing cylinder has been filled to a predefined filling level,
stopping the freezer inlet pump,
ensuring that the passages through the inlet pipe and the outlet pipe, respectively, are both blocked to be air-tight at least at a desired cylinder pressure of the freezer corresponding to a desired overrun,
adding air through the air inlet until a certain amount of ice cream mix and a certain amount of air substantially corresponding to the desired overrun is entrapped in the freezing cylinder,
starting cooling of the freezing cylinder and rotation of a dasher inside the freezing cylinder.

11. The method according to claim 10, wherein the method comprises controlling the ice cream production apparatus to assume the pre-production mode, from start-up freezer mode, when the pre-production viscosity value of the ice cream in the freezing cylinder is reached, by opening the passages through the inlet pipe and the outlet pipe,
starting the freezer inlet and outlet pumps, and
adding second air in a measured amount corresponding to the desired overrun.

12. Ice cream production apparatus for producing edible ice cream, said apparatus comprising:
a freezer for freezing the ice cream,
a piping system provided from the freezer to one or more outlet nozzles of one or more filling or extrusion lines downstream the freezer,
a freezer outlet pump for pumping the ice cream from the freezer into the piping system,
a control unit controlling the ice cream production apparatus, wherein said apparatus having two operational modes:
a first operational mode being a production mode in which the freezer is configured to freeze the ice cream such that it obtains a production viscosity value, and the freezer outlet pump is configured to pump the ice cream into the piping system at a production outlet flow, and
a second operational mode being a pre-production mode in which the freezer is configured to freeze the ice cream such that it obtains a pre-production viscosity value which is equal to or higher than the production viscosity value, and the freezer outlet pump is configured to pump the ice cream into the piping system, without recirculating the ice cream to the freezer, at a pre-production outlet flow being smaller than the production outlet flow,
wherein the control unit is adapted to control the apparatus to assume the pre-production mode in order to cool the piping system and the one or more outlet nozzles before assuming the production mode.

13. The ice cream production apparatus according to claim 12, wherein the control unit is adapted to control the ice cream production apparatus to assume the pre-production mode until a pre-defined time has elapsed or until a temperature of said piping system and said one or more nozzles is within a preset production temperature range.

14. The ice cream production apparatus according to claim 12, wherein the freezer comprises a freezer inlet pump adapted to pump ice cream mix into the freezer and an air inlet adapted to provide air into the freezer, wherein in the production mode the freezer inlet pump is adapted to pump the ice cream mix at a production inlet flow and the air inlet is adapted to provide air at a production air flow, and in the pre-production mode the freezer inlet pump is adapted to pump the ice cream mix at a pre-production inlet flow being smaller than the production inlet flow, and the air inlet is adapted to provide the air at a pre-production air flow being smaller than the production air flow.

15. The ice cream production apparatus according to claim 14, wherein the control unit is provided to control all of the flows such that a ratio of the pre-production inlet flow and the pre-production air flow is substantially equal to a ratio of the production inlet flow and the production air flow in order to maintain a pre-defined overrun from the pre-production mode to the production mode.

16. The ice cream production apparatus according to claim 12, wherein the freezer outlet pump is a positive displacement pump.

17. The ice cream production apparatus according to claim 12, wherein the freezer is a through-flow freezer.

18. The ice cream production apparatus according to claim 12, wherein the ice cream production apparatus comprises temperature sensors for measuring the temperature of said piping system and/or said one or more nozzles.

19. An ice cream production system comprising:
a first apparatus adapted to pre-heat liquid ice cream ingredients and to mix said ingredients with dry ice cream ingredients for formation of an ice cream mix,
a second apparatus adapted to homogenize, pasteurize and cool the ice cream mix,
a third apparatus adapted to age the ice cream mix, and
a fourth apparatus being the apparatus according to claim 12.

* * * * *